(12) United States Patent
Zhang et al.

(10) Patent No.: US 12,448,046 B2
(45) Date of Patent: Oct. 21, 2025

(54) SUSPENSION SUPPORT FOR IMPROVING COLLISION PERFORMANCE, POWER ASSEMBLY STRUCTURE, AND AUTOMOBILE

(71) Applicants: Zhejiang Geely Holding Group Co., Ltd., Hangzhou (CN); Zhejiang Liankong Technologies Co., Ltd., Ningbo (CN)

(72) Inventors: Zhongxiao Zhang, Hangzhou (CN); Liyou Li, Hangzhou (CN); Huicai Lu, Hangzhou (CN); Jingsheng Wang, Hangzhou (CN)

(73) Assignees: Zhejiang Geely Holding Group Co., Ltd., Hangzhou (CN); Zhejiang Liankong Technologies Co., Ltd., Ningbo (CN)

( * ) Notice: Subject to any disclaimer, the term of this patent is extended or adjusted under 35 U.S.C. 154(b) by 0 days.

(21) Appl. No.: 18/689,086

(22) PCT Filed: Jun. 17, 2022

(86) PCT No.: PCT/CN2022/099341
§ 371 (c)(1),
(2) Date: Oct. 10, 2024

(87) PCT Pub. No.: WO2023/035716
PCT Pub. Date: Mar. 16, 2023

(65) Prior Publication Data
US 2025/0033700 A1    Jan. 30, 2025

(30) Foreign Application Priority Data
Sep. 8, 2021  (CN) .......................... 202111048639.3

(51) Int. Cl.
*B62D 21/11* (2006.01)
*B62D 21/15* (2006.01)

(52) U.S. Cl.
CPC ............ *B62D 21/11* (2013.01); *B62D 21/155* (2013.01)

(58) Field of Classification Search
CPC ...... B62D 21/11; B62D 21/155; B62D 21/15; B62D 21/00; B60K 5/1275;
(Continued)

(56) References Cited

U.S. PATENT DOCUMENTS 8,870,205 B2 * 10/2014 Corby .................... B60G 7/001
                                                     180/274
2019/0031011 A1   1/2019 Fujlaki

FOREIGN PATENT DOCUMENTS

CN       208827576 U     5/2019
CN       109885963 A     6/2019
(Continued)

OTHER PUBLICATIONS

Tunzini, EP-1167092-A2, Machine Translation of Specification (Year: 2002).*
(Continued)

*Primary Examiner* — Drew J Brown
*Assistant Examiner* — Matthew Joseph Ganci
(74) *Attorney, Agent, or Firm* — Andrew C. Cheng

(57) ABSTRACT

A suspension support for improving collision performance, a power assembly structure, and an automobile. The suspension support includes a first sub-frame mounting portion, a suspension front arm and a power assembly mounting portion. The suspension front arm is connected between the first sub-frame mounting portion and the power assembly mounting portion. The first sub-frame mounting portion is connected to a sub-frame. The power assembly mounting
(Continued)

portion is connected to a power assembly. The suspension support is configured to break at the suspension front arm under the squeeze of the power assembly. The suspension support is designed into a collision fracture structure, such that the suspension support may break in a collision, avoiding the power assembly impacting with a front dash panel, and solving the problem of serious collision injuries of the occupants due to the power assembly squeezing on a passenger compartment and causing serious deformation.

21 Claims, 5 Drawing Sheets

(58) Field of Classification Search
CPC ...... B60Y 2306/01; B60G 7/02; B60G 7/001; B60G 2204/1162; B60G 2206/7101; B60G 2206/013; B60G 2206/124; B60G 2206/821; B60G 2204/143; B60G 7/00
See application file for complete search history.

(56) References Cited

FOREIGN PATENT DOCUMENTS

| | | | | |
|---|---|---|---|---|
| CN | 211918301 | U | | 11/2020 |
| CN | 212637152 | U | * | 3/2021 |
| CN | 112776581 | A | | 5/2021 |
| CN | 112895874 | A | | 6/2021 |
| CN | 113928104 | A | | 1/2022 |
| DE | 102019206217 | A1 | * | 11/2020 |
| EP | 1167092 | A2 | * | 1/2002 ............ B60G 7/001 |
| EP | 2189317 | A1 | | 5/2010 |
| GB | 2585027 | A | | 12/2020 |
| JP | 2000289468 | A | | 10/2000 |
| JP | 2002002310 | A | | 1/2002 |
| JP | 2002012040 | A | | 1/2002 |
| JP | 2004231018 | A | | 8/2004 |
| JP | 2007090965 | A | | 4/2007 |
| JP | 2008126927 | A | | 6/2008 |
| JP | 2013169856 | A | | 9/2013 |
| KR | 20070002508 | A | | 1/2007 |
| KR | 20160093700 | A | * | 8/2016 |

OTHER PUBLICATIONS

Buettner, DE-102019206217-A1, Machine Translation of Specification (Year: 2020).*
Yang, CN-212637152-U, Machine Translation of Specification (Year: 2021).*
Rollet, KR 20160093700 A , Machine Translation of Specification (Year: 2016).*
International search report of PCT patent application No. PCT/CN2022/099341 issued on Aug. 30, 2022.
Search report of CN application No. 2021110486393 issued on Jan. 11, 2023.
The extended European search report of EP patent application No. 22866191.4 issued on Aug. 4, 2025.

* cited by examiner

SUSPENSION SUPPORT FOR IMPROVING COLLISION PERFORMANCE, POWER ASSEMBLY STRUCTURE, AND AUTOMOBILE

CROSS-REFERENCE TO RELATED APPLICATIONS

The present document is a 35 U.S.C. § 371 National Phase conversion of International (PCT) Patent Application No. PCT/CN2022/099341, filed on Jun. 17, 2022. The PCT International Patent Application was filed and published in Chinese.

TECHNICAL FIELD

The present document relates to a field of automotive technology, in particular to a suspension support for improving collision performance, a power assembly structure and an automobile.

DESCRIPTION OF RELATED ART

In this era of industrial globalization, the development of the automotive industry is very mature. With the continuous development of the global economy and the increasing demand for travel, automobiles have become indispensable means of transportation. Automobiles have brought a lot of convenience to people's travel and have also brought unprecedented opportunities to the consumer market for automobiles. The number of family automobiles has grown unprecedentedly, and has reversely promoted the further development of the automobile industry. However, the problems brought about by the development of the automotive industry are also obvious. The number of traffic accidents continues to increase. The main reason for common traffic accidents is that high-speed automobiles undergo severe collision deformation during the impact process. The large deformation of the passenger compartment severely compresses the survival space of the occupants, causing serious collision injuries or even death to the occupants. This puts forward a clear requirement for automotive collision design, which is to ensure the collision survival space of the passenger compartment and leave enough survival space for the occupants in the automobile.

The reason for the injury to the occupants in the automobile is that when an automobile collides, the poorly designed collision structure causes the poor transmission of collision force and insufficient energy absorption, resulting in a severe lack of survival space in the passenger compartment after the collision, thereby compressing the survival space and resulting a greater degree of injury damage to the occupants.

Therefore, it is necessary to provide a suspension support for improving collision performance and effectively ensure the survival space in the passenger compartment to solve the above technical problems.

SUMMARY

In order to solve the above technical problems, the present document provides a suspension support for improving collision performance, which solves the problem in the existing technology that the passenger compartment is severely deformed under the squeeze of the power assembly when an automobile undergoes a collision, causing serious collision injuries to the occupants in the automobile.

The technical effects of the present document are achieved through the following techniques.

A suspension support for improving collision performance includes a first sub-frame mounting portion, a suspension front arm and a power assembly mounting portion. The suspension front arm is fixedly connected between the first sub-frame mounting portion and the power assembly mounting portion. The first sub-frame mounting portion is configured for being fixedly connected to a sub-frame of an automobile, and the power assembly mounting portion is configured for being fixedly connected to a power assembly of the automobile. The suspension support is arranged to break at the suspension front arm when the power assembly of the automobile squeezes the suspension front arm. By arranging the suspension support as a collision fracture structure, the suspension support breaks when the automobile collides, which improves the collision performance of the automobile, avoids the power assembly squeezing a front dash panel of the automobile, ensures the survival space in the passenger compartment, and solves the serious deformation of the passenger compartment caused by the squeeze of the power assembly of the automobile in the existing technology, causing serious collision to the passengers in the automobile.

Furthermore, a front arm fracture inducing portion is provided on the suspension front arm, and the suspension support is arranged to cause the suspension front arm to break at the position of the front arm fracture inducing portion when the suspension front arm is squeezed by the power assembly of the automobile. By providing the front arm fracture inducing portion on the suspension front arm, the suspension support may break at the position of the suspension front arm during a collision, inducing the power assembly to descend in the Z direction, avoiding the severe impact with the front dash panel of the automobile, effectively utilizing the deformation space of the suspension support in the Z direction, effectively solving the problem of excessive deformation of the front dash panel caused by the impact of the power assembly, and reducing the degree of injury to the occupants.

Furthermore, it further includes a suspension rear arm and a second sub-frame mounting portion. The second sub-frame mounting portion is configured for being fixedly connected to the sub-frame of the automobile, and the suspension rear arm is fixedly connected between the second sub-frame mounting portion and the power assembly mounting portion, and the suspension rear arm is configured to break after the suspension front arm breaks under the squeeze of the power assembly of the automobile.

Furthermore, a rear arm fracture inducing portion is provided on the suspension rear arm, and the suspension rear arm is arranged to break at the position of the rear arm fracture inducing portion after the suspension front arm breaks under the squeeze of the power assembly of the automobile. By providing the rear arm fracture inducing portion on the suspension rear arm, the power assembly continuously squeezes the suspension support during the descending process, which causes the suspension rear arm to break. This not only ensures the collision fracture but also increases the Z-direction descending displacement of the power assembly, reducing the collision pressure on the front dash panel and thus reducing the design weight and the cost of the front dash panel.

Furthermore, the suspension front arm and/or the suspension rear arm are provided with an inner cavity. By arranging the inner cavity on the suspension front arm and the suspension rear arm, the collision fracture deformation of the suspension support is easier to control, and at the same time, the internal structure of the suspension support is also made lighter.

Furthermore, the power assembly mounting portion is provided with a slot. By providing the slot, the weight of the suspension support is reduced, which meets the lightweight requirements of automobiles.

Furthermore, the number of the slot is multiple, and a reinforcement rib is provided between adjacent slots. By providing the reinforcement rib between the slots, the connection strength of the suspension support on the sub-frame is increased, ensuring the stability of the connection between the suspension support and the sub-frame when the automobile is in normal use.

Furthermore, the first sub-frame mounting portion and/or the second sub-frame mounting portion are provided with avoidance notches on their sidewalls, which are configured for checking the connection status between the first sub-frame mounting portion and/or the second sub-frame mounting portion and the sub-frame of the automobile. By providing the avoidance notches, the installation of the suspension support may be checked from the top after the suspension support is mounted to the sub-frame, which is convenient for the check.

In addition, the present document also provides a power assembly structure which includes a power assembly, a sub-frame, and the aforementioned suspension support for improving collision performance, wherein the suspension support is fixedly mounted to the sub-frame, the power assembly is fixedly connected to the suspension support through the power assembly mounting portion.

In addition, the present document further provides an automobile, which includes the aforementioned power assembly structure.

As mentioned above, the present document has the following beneficial effects:

1) By designing the suspension support as a collision fracture structure, the suspension support will break when the automobile collides, improving the collision performance of the automobile and reducing the impact of the power assembly on the front dash panel, ensuring the survival space in the passenger compartment, and solving the problem in the existing technology of severe deformation of the passenger compartment under the squeeze of the power assembly and causing serious collision injuries to the occupants in the event of a collision.

2) By providing a front arm fracture inducing portion on the suspension front arm, the suspension support may break at the positon of the suspension front arm in the event of the collision, inducing the power assembly to descend in the Z direction, avoiding severe impact with the front dash panel, effectively utilizing the deformation space of the suspension support in the Z direction, and effectively solving the problem of excessive deformation of the front dash panel due to the impact of the power assembly and further reducing the degree of injury to the occupants.

3) By providing a rear arm fracture inducing portion on the suspension rear arm, the power assembly can continuously squeeze the suspension support during the descending process which causes the suspension rear arm to break. This not only ensures the collision fracture but also increases the Z-direction descending displacement of the power assembly, reducing the collision pressure on the front dash panel, thereby reducing the design weight and the cost of the front dash panel.

(4) By providing the inner cavity in the suspension front arm and the suspension rear arm, the collision fracture deformation of the suspension support is easier to control, and at the same time, the internal structure of the suspension support is also made lighter.

(5) By providing the reinforcement rib between the slots, the connection strength of the suspension support on the sub-frame is increased, which ensures the stability of the connection between the suspension support and the sub-frame when the automobile is in normal use.

(6) By providing the avoidance notches, the installation of the suspension support can be checked from the top after the suspension support is installed on the sub-frame, which facilitates the check.

BRIEF DESCRIPTION OF THE DRAWINGS

In order to explain the technical solution of the present document more clearly, the drawings needed to be used in the embodiments or description of the prior art will be briefly introduced below. Obviously, the accompanying drawings in the following description only show part of the embodiments of the present document. For those of ordinary skill in the art, it is possible to obtain other drawings based on these drawings without creative work.

Figure 1:
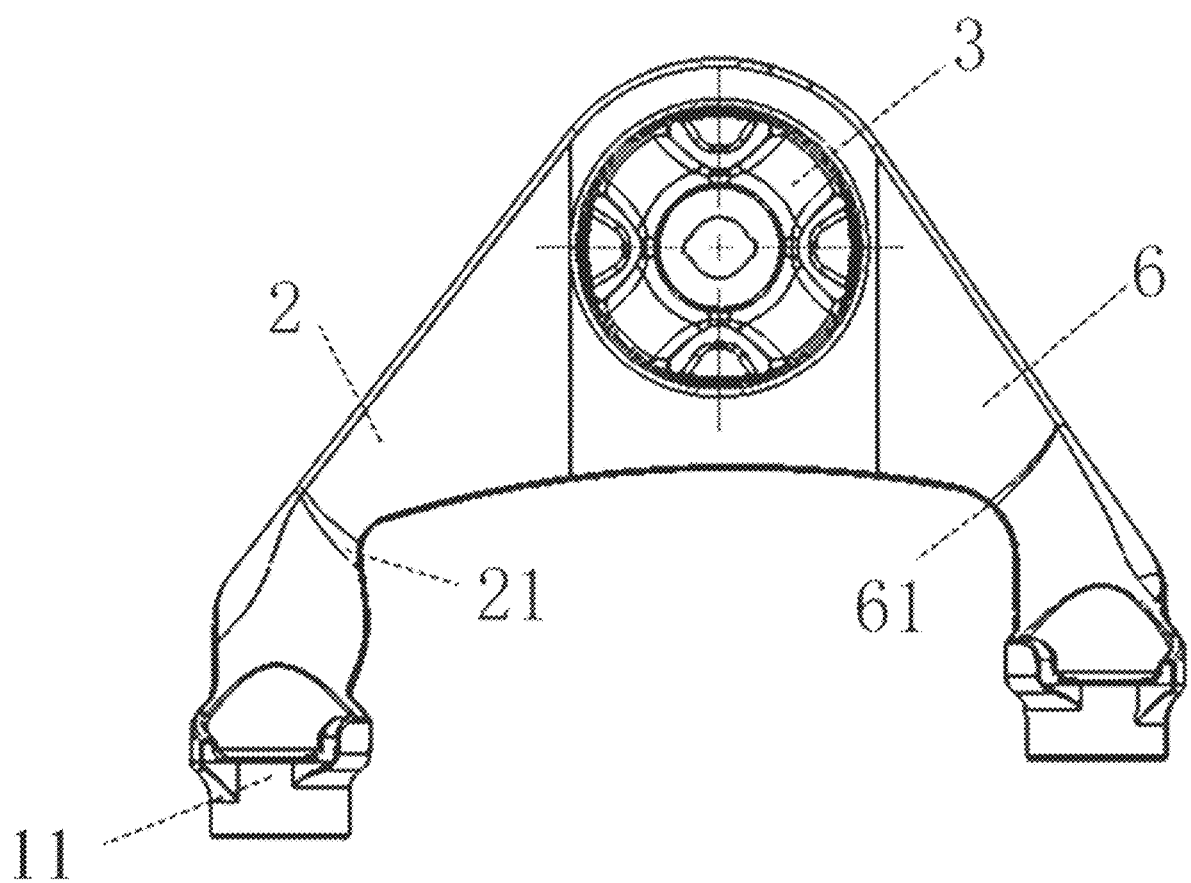
FIG. 1 is a schematic, structural view of a suspension support for improving collision performance of an embodiment of the present document.
Figure 2:
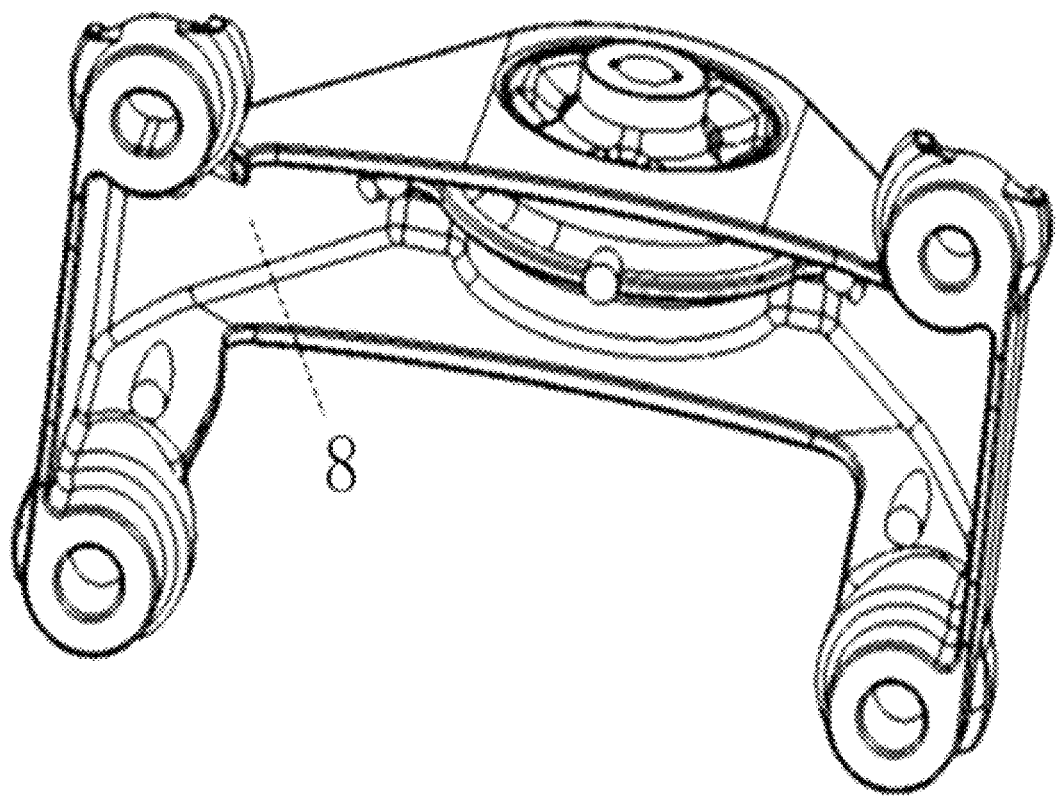
FIG. 2 is a bottom view of FIG. 1.
Figure 3:
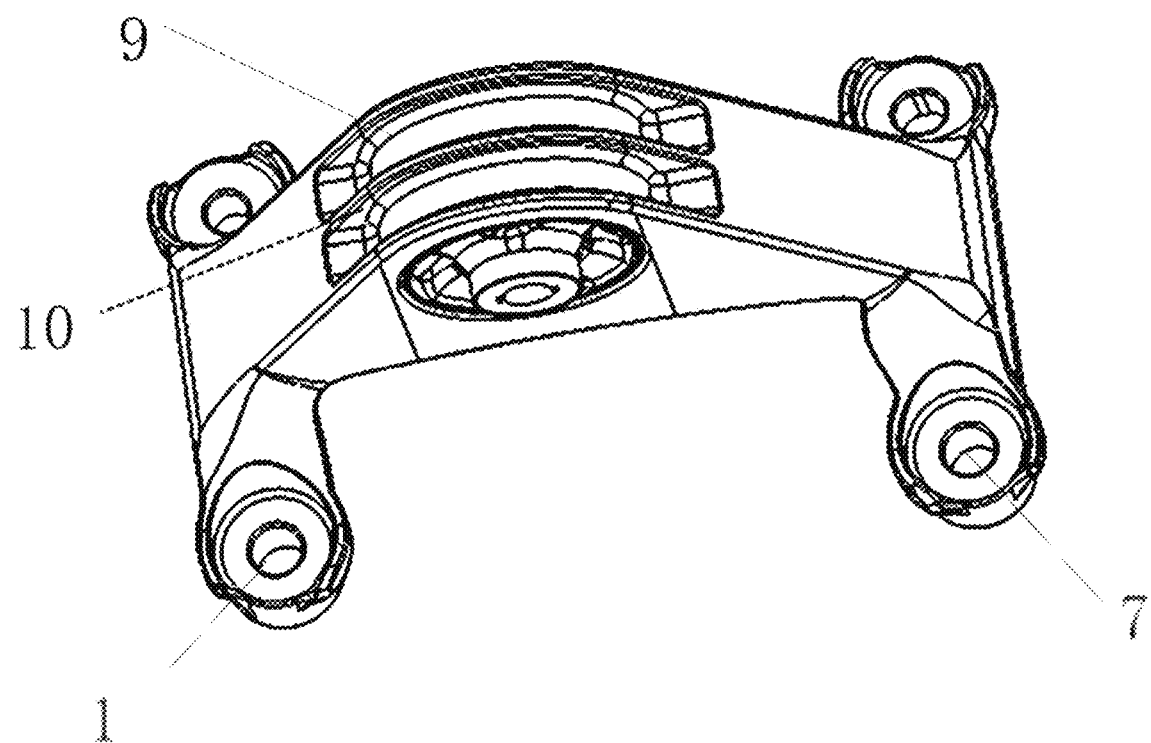
FIG. 3 is a top view of FIG. 1.

Among them, the reference numbers in the figure correspond to:

first sub-frame mounting portion 1, suspension front arm 2, front arm fracture inducing portion 21, power assembly mounting portion 3, sub-frame 4, power assembly 5, suspension rear arm 6, rear arm fracture inducing portion 61, second sub-frame mounting portion 7, inner cavity 8, slot 9, reinforcement rib 10, avoidance notch 11.

DETAILED DESCRIPTION OF THE EMBODIMENTS

The technical solutions in the exemplary embodiments of the present document will be clearly and completely described below with reference to the accompanying drawings in the embodiments of the present document. Obviously, the described embodiments are only part of the embodiments of the present document but not all the embodiments. Based on the embodiments of the present document, other embodiments obtained by those of ordinary skill in the art without creative work also fall within the protection scope of the present document.

It should be noted that the terms "first", "second", etc. in the description and claims of the present document and the above-mentioned drawings are configured for distinguish similar objects and are not necessarily configured for describe a specific order or sequence. It is to be understood that the data so used are interchangeable under appropriate circumstances so that the embodiments of the present document described herein are capable of being practiced in sequences other than those illustrated or described herein. In addition, the terms "including" and "having" and any variations thereof are intended to cover non-exclusive inclusions, e.g., a process, method, system, product, or apparatus that encompasses a series of steps or units are not need to be limited to those explicitly listed. Instead, they may include other steps or units that are not clearly listed or inherent to the process, methods, products or apparatus.

Embodiment 1

As shown in FIG. 1 to FIG. 5, a suspension support for improving collision performance includes a first sub-frame mounting portion 1, a suspension front arm 2 and a power assembly mounting portion 3. The suspension front arm 2 is fixedly connected between the first sub-frame mounting portion 1 and the power assembly mounting portion 3. The first sub-frame mounting portion 1 is configured for being fixedly connected to a sub-frame 4 of an automobile, and the power assembly mounting portion 3 is configured for being fixedly connected to a power assembly 5 of the automobile. The suspension support is configured to break at the suspension front arm 2 when the power assembly 5 of the automobile is squeezed against the suspension front arm 2. Generally, when an automobile collides, due to the impact of the collision on the power assembly 5 of the automobile, the power assembly 5 is squeezed against the suspension front arm 2.

It should be noted that in the structure of the automobile of the prior art, the suspension support is arranged behind the power assembly 5, and the front dash panel is arranged behind the suspension support. The suspension support is designed to be short and small, mainly for connecting with the sub-frame 4. When a front of the automobile encounters a high-speed collision, the suspension support behind the power assembly 5 breaks. However, due to the small size and the short force arm of the suspension support, the suspension support breaks later. As a result, the power assembly 5 does not have enough time to descend and could not effectively avoid collisions, which results the power assembly 5 violently hitting the front dash panel of the automobile, and seriously reducing the survival space of the occupants in the passenger compartment. The direction from the rear to the front is the driving direction of the automobile, which is the X direction. The direction perpendicular to the X direction on the plane where the automobile locates is the Y direction, and the direction perpendicular to the X direction and the Y direction is the Z direction.

Specifically, the suspension support in the present document is designed into a collision fracture structure, and the suspension front arm 2 is designed to have a greater Z-direction size, so that when the automobile collides, the suspension support breaks and the power assembly has a larger Z-direction descending space, effectively reduces the collision with the front dash panel, improves the collision performance of the automobile, ensures the survival space in the passenger compartment, and solves the problem in the prior art that when the automobile collides, the passenger compartment is squeezed by the power assembly 5 of the automobile and severely deformed, causing serious collision injuries to the occupants in the automobile.

Preferably, the suspension front arm 2 is provided with a front arm fracture inducing portion 21, and the suspension support is configured that the suspension front arm 2 breaks at the position of the front arm fracture inducing portion 21 when the power assembly 5 of the automobile is squeezed against the suspension front arm 2, which induces the power assembly 5 to descend in the Z-direction, avoids the violent impact with the front dash panel, effectively utilizes the deformation space of the suspension support in the Z direction, and effectively solves the problem of excessive deformation of the front dash panel due to the impact of the power assembly and reduces the degree of injury to the occupants.

Preferably, the suspension support further includes a suspension rear arm 6 and a second sub-frame mounting portion 7. The second sub-frame mounting portion 7 is configured for being fixedly connected to the sub-frame 4 of the automobile. The suspension rear arm 6 is fixedly connected between the second sub-frame mounting portion 7 and the power assembly mounting portion 3. The suspension rear arm 6 is arranged to break after the suspension front arm 2 breaks under the squeeze of the power assembly 5 of the automobile.

Specifically, the suspension support composed by the first sub-frame mounting portion 1, the suspension front arm 2, the power assembly mounting portion 3, the suspension rear arm 6 and the second sub-frame mounting portion 7 is an integrated structure, and the suspension support is made of rigid material, preferably an aluminum alloy material.

Preferably, the suspension rear arm 6 is provided with a rear arm fracture inducing portion 61, and the suspension rear arm 6 is configured to break at the positon of the rear arm fracture inducing portion 61 after the suspension front arm 2 breaks under the squeeze of the power assembly 5 of the automobile. On the basis of ensuring the collision fracture, the Z-direction descending displacement of the power assembly 5 is further increased, reducing the collision pressure on the front dash panel, thereby also reducing the design weight and the cost of the front dash panel.

Specifically, the front arm fracture inducing portion 21 and the rear arm fracture inducing portion 61 are weakened structures. The weakened structures may have a thickness smaller than the thickness of other parts of the corresponding suspension front arm 2 or the corresponding suspension rear arm 6. The weakened structure may also be provided with disconnections or openings, so that when the suspension front arm 2 and the suspension rear arm 6 are squeezed, they can quickly break at the weakened structures and meet the requirements of collision performance.

The suspension support further includes a left panel, a right panel spacing a distance from the left panel, and a connection panel connected between top outer peripherals of the left panel and the right panel. Each of the left panel and the right panel has a main portion corresponding to the power assembly mounting portion 3, a front arm portion at a front side of the main portion, and a rear arm portion at a rear side of the main portion. The front arm portions of the left panel and the right panel form the suspension front arm 6 of the suspension support. The rear arm portions of the left panel and the right panel form the suspension rear arm 6 of the suspension support. The first sub-frame mounting portion 1 includes two first mounting blocks outwardly extending from the left panel and the right panel. The second sub-frame mounting portion 7 includes two second mounting blocks outwardly extending from the left panel and the right panel. Each of the first mounting blocks has a first annular wall upwardly extending therefrom, each of the second mounting blocks has a second annular wall downwardly extending therefrom. Each of the front arm portions includes a front arm connected with the first mounting block, and a front connection portion connected between the front arm and the main portion. Each of the rear arm portions includes a rear arm connected with the second mounting block and a rear connection portion connected between the rear arm and the main portion. The front connection portion is substantially triangular shaped, and the front arm extend downwardly from a front corner of the front connection portion. The front arm fracture inducing portion 21 is formed at the front corner. The rear connection portion is substantially triangular shaped, and the rear arm extend downwardly from a rear corner of the rear connection portion. The rear arm fracture inducing portion 61 is formed at the rear corner.

Preferably, the suspension front arm 2 and the suspension rear arm 6 are provided with an inner cavity 8 so that the deformation of the suspension support is easier to control, and at the same time, the internal structure of the suspension support is made lighter. The inner cavity 8 is formed between the left panel, the right panel and the connection panel.

In this embodiment, the power assembly mounting portion 3 is provided with two slots 9. The two slots 9 are two are depressions formed on the connection panel and a reinforcement rib 10 is provided between the two slots 9. Providing the slots 9 helps to achieve the lightweight goal of the automobile, and the reinforcement rib 10 is provided between the slots 9, to increase the connection strength of the suspension support on the sub-frame, ensuring the stability of the connection between the suspension support and the sub-frame 4 during normal use of the automobile.

Preferably, the first sub-frame mounting portion 1 and the second sub-frame mounting portion 7 are provided with avoidance notches 11 on their sidewalls, and the avoidance notches 11 are configured for checking the connection state between the first sub-frame mounting portion 1, the second sub-frame mounting portion 7 and the sub-frames 4 of the automobile.

Embodiment 2

Figure 4:
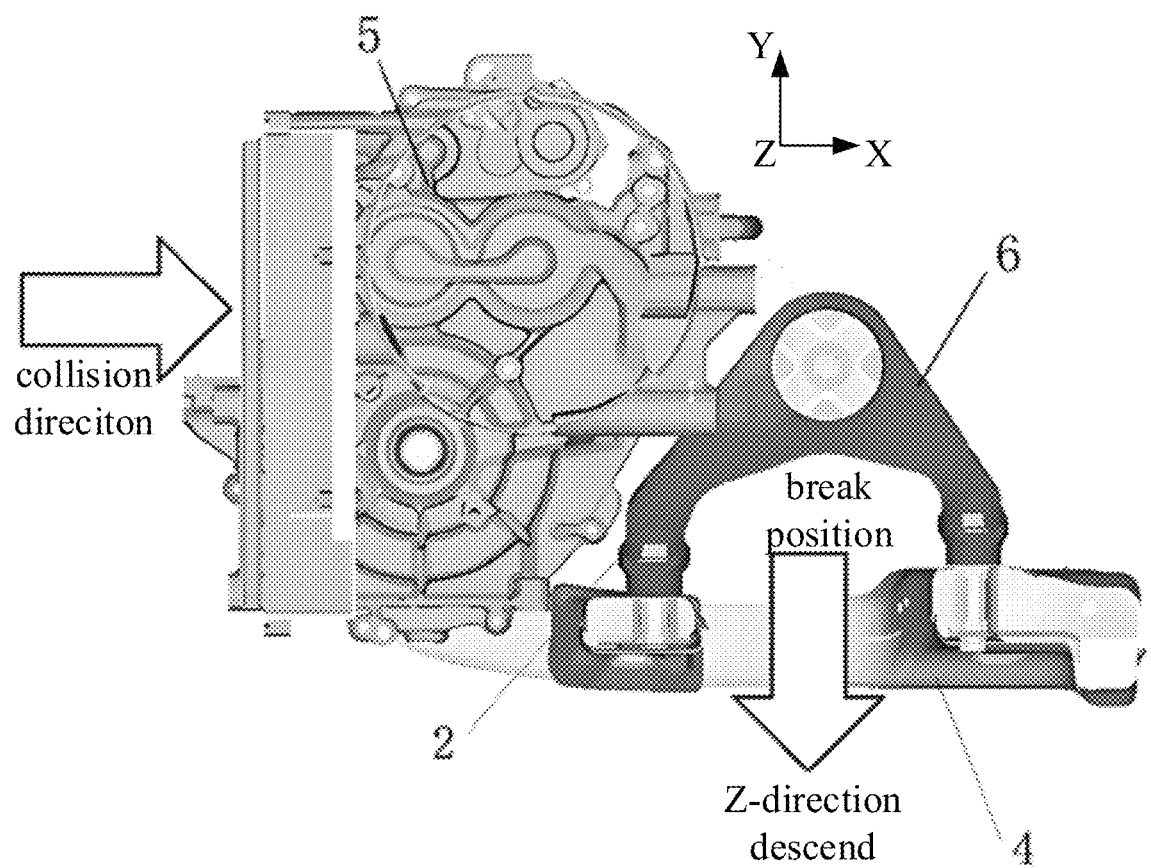
FIG. 4 is a schematic, structural view of a power assembly structure of an embodiment of the present document.
Figure 5:
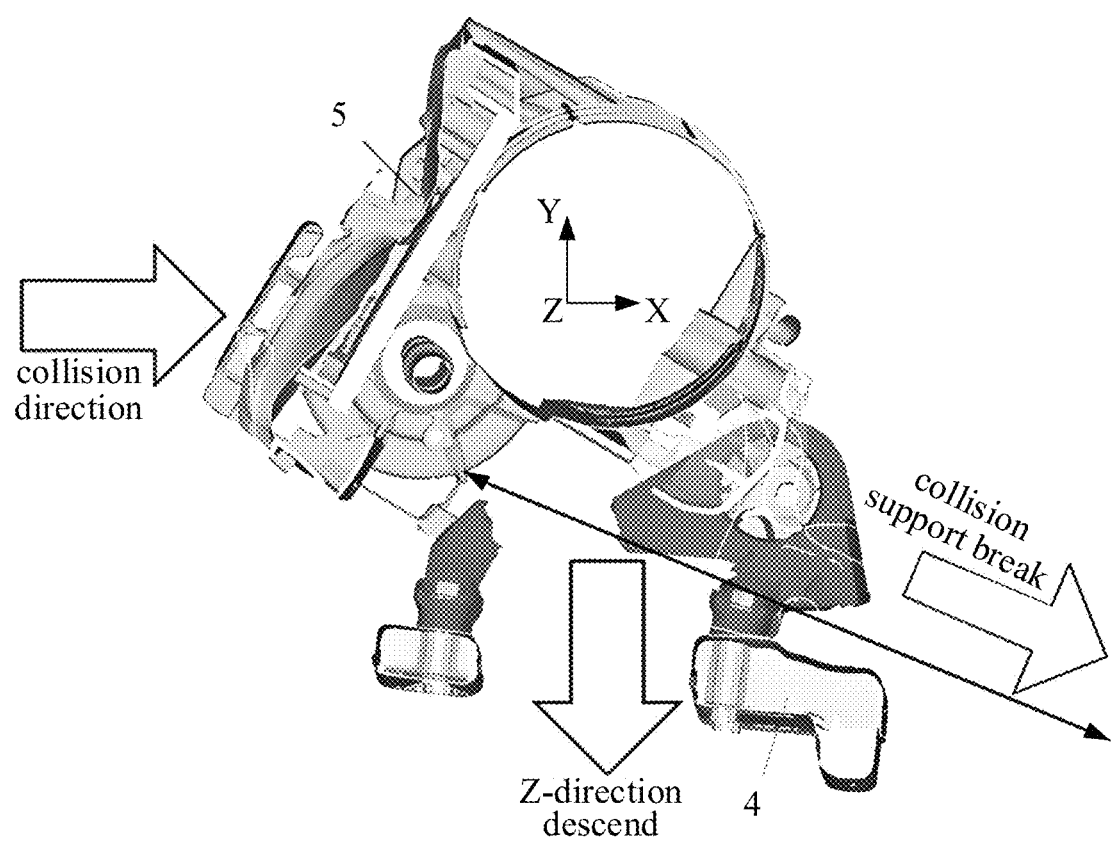
FIG. 5 is a schematic, structural view showing a power assembly structure of an embodiment of present document when the front of the automobile encounters a collision.

As shown in FIG. 4 to FIG. 5, a power assembly structure includes a power assembly 5, a sub-frame 4 and the suspension support for improving collision performance in Embodiment 1. The suspension support is fixedly mounted to the sub-frame 4, the power assembly 5 is fixedly connected to the suspension support through the power assembly mounting portion 3. The suspension support in Embodiment 1 is used in the power assembly structure, so that the power assembly structure squeezes the suspension support to break when the front of the automobile collides, inducing the power assembly 5 to descend in the Z-direction, which effectively solves the common problem that the front dash panel of the automobile body is excessively deformed due to the impact of the power assembly 5, and reduces the damage degree to the occupants.

Embodiment 3

An automobile including the power assembly structure in Embodiment 2, which effectively improves the collision performance of the front collision of the automobile, increases the survival space in the passenger compartment, and provides effective front collision development strategy for many models developed later.

As mentioned above, the present document has the following beneficial effects:

1) By designing the suspension support into a collision fracture structure, the suspension support may break when the automobile collides, which improves the collision performance of the automobile, reduces the impact of the power assembly of the automobile on the front dash panel, and ensures the survival space in the passenger compartment, solves the problem in the prior art that when an automobile collides, the power assembly of the automobile squeezes the passenger compartment to severely deform and causes serious collision injuries to the occupants in the automobile.

2) By providing a front arm break inducing portion on the suspension front arm, the suspension support may break at the suspension front arm in the event of a collision, inducing the power assembly to descend in a Z-direction due to collision and avoiding violent impact with the front dash panel, effectively utilizing the deformation space of the suspension support in Z-direction, effectively solving the problem of excessive deformation of the front dash panel due to the impact of the power assembly and further reducing the degree of injury to the occupants.

3) By providing the rear arm fracture inducing portion on the suspension rear arm, the power assembly can continuously squeeze the suspension support during the descending process which causes the suspension rear arm to break. This not only ensures the collision fracture but also increases the Z-direction descending displacement of the power assembly, reducing the collision pressure on the front dash panel, thereby reducing the design weight and the cost of the front dash panel.

4) By providing the inner cavity in the suspension front arm and the suspension rear arm, the collision fracture deformation of the suspension support is easier to control, and at the same time, the internal structure of the suspension support is also made lighter.

5) By providing the reinforcement rib between the slots, the connection strength of the suspension support on the sub-frame is increased, which ensures the stability of the connection between the suspension support and the sub-frame when the automobile is in normal use.

6) By providing the avoidance notches, the installation of the suspension support can be checked from the top after the suspension support is installed on the sub-frame, which facilitates the check.

The present document not only provides a design structure of the suspension support, but also provides a design strategy for front collision. Under the design strategy of the present document, different suspension supports designed according to the structural design and layout space of different automobile models still fall within the protection scope of the present document.

Although the present document has been described through preferred embodiments, the present document is not limited to the embodiments described here and further includes various modifications or changes made without departing from the spirit of the present document.

In this article, the locative terms such as front, back, upper, lower and etc. are defined based on the locations of the components in the drawings and the positions of the components relative to each other, only for the sake of clarity and convenience in expressing the technical solution. It should be understood that the use of the locative terms shall not limit the scope of protection claimed in the present document.

The above-described embodiments and features in the embodiments can be combined with each other without conflict.

What is disclosed above is only preferred embodiments of the present document. Of course, it cannot be used to limit the scope of the present document. Therefore, equivalent changes made according to the claims of the present document still fall within the scope of the present document.

What is claimed is:

1. A suspension support for improving collision performance, comprising: a first sub-frame mounting portion, a suspension front arm and a power assembly mounting portion, the suspension front arm being fixedly connected between the first sub-frame mounting portion and the power assembly mounting portion, the first sub-frame mounting portion being positioned lower than the power assembly mounting portion, the first sub-frame mounting portion being configured for being fixedly connected to a sub-frame of an automobile, the power assembly mounting portion being configured for being fixedly connected to a power assembly of the automobile, the suspension front arm being provided with a front arm fracture inducing portion, and the suspension support being configured to break at the front arm fracture inducing portion and descend along the Z-direction when the power assembly squeezes the suspension front arm.

2. The suspension support for improving collision performance according to claim 1, wherein further comprising a suspension rear arm and a second sub-frame mounting portion, the second sub-frame mounting portion is configured for being fixedly connected to the sub-frame of the automobile, the suspension front arm and the suspension rear arm are located ahead of and behind the power assembly mounting portion respectively, the the suspension rear arm is fixedly connected between the second sub-frame mounting portion and the power assembly mounting portion, the suspension rear arm is arranged to break after the suspension front arm breaks under the squeeze of the power assembly of the automobile.

3. The suspension support for improving collision performance according to claim 2, wherein the suspension rear arm is provided with a rear arm fracture inducing portion, and the suspension rear arm is arranged to break at the rear arm fracture inducing portion after the suspension front arm breaks under the squeeze of the power assembly of the automobile.

4. The suspension support for improving collision performance according to claim 2, wherein the suspension front arm and/or the suspension rear arm are provided with an inner cavity, the suspension front arm and/or the suspension rear arm include/includes two plates extending along the X-direction and the inner cavity is formed between the plates.

5. The suspension support for improving collision performance according to claim 1, wherein the power assembly mounting portion is provided with a slot.

6. The suspension support for improving collision performance according to claim 5, wherein the number of the slot is multiple, and a reinforcement rib is provided between adjacent slots.

7. The suspension support for improving collision performance according to claim 2, wherein the first sub-frame mounting portion and/or the second sub-frame mounting portion are provided with avoidance notches on their sidewalls, and the avoidance notches are configured for checking a connection state between the first sub-frame mounting portion and/or the second sub-frame mounting portion and the sub-frame of the automobile.

8. A power assembly structure, comprising a power assembly, a sub-frame and a suspension support for improving collision performance,
the suspension support for improving collision performance comprising:
a first sub-frame mounting portion, a suspension front arm and a power assembly mounting portion, the suspension front arm being fixedly connected between the first sub-frame mounting portion and the power assembly mounting portion, the first sub-frame mounting portion being positioned lower than the power assembly mounting portion, the first sub-frame mounting portion being configured for being fixedly connected to the sub-frame, the power assembly mounting portion being configured for being fixedly connected to the power assembly, the suspension front arm being provided with a front arm fracture inducing portion, and the suspension support being configured to break at the front arm fracture inducing portion and descend along the Z-direction when the power assembly squeezes the suspension front arm.

9. An automobile, comprising a power assembly structure comprising:
a power assembly, a sub-frame and a suspension support for improving collision performance, the suspension support for improving collision performance comprising:
a first sub-frame mounting portion, a suspension front arm and a power assembly mounting portion, the suspension front arm being fixedly connected between the first sub-frame mounting portion and the power assembly mounting portion, the first sub-frame mounting portion being positioned lower than the power assembly mounting portion, the first sub-frame mounting portion being configured for being fixedly connected to the sub-frame, the power assembly mounting portion being configured for being fixedly connected to the power assembly, the suspension front arm being provided with a front arm fracture inducing portion, and the suspension support being configured to break at the front arm fracture inducing portion and descend along the Z-direction of the automobile when the power assembly squeezes the suspension front arm.

10. The automobile according to claim 9, wherein further comprising a suspension rear arm and a second sub-frame mounting portion, the second sub-frame mounting portion is configured for being fixedly connected to the sub-frame of the automobile, the suspension front arm and the suspension rear arm are located ahead of and behind the power assembly mounting portion respectively, the suspension rear arm is fixedly connected between the second sub-frame mounting portion and the power assembly mounting portion, and the suspension rear arm is provided with a rear arm fracture inducing portion, the suspension rear arm is arranged to break after the suspension front arm breaks under the squeeze of the power assembly of the automobile.

11. The automobile according to claim 10, wherein the suspension front arm and/or the suspension rear arm are provided with an inner cavity, the suspension front arm and/or the suspension rear arm include/includes two plates extending along the X-direction and the inner cavity is formed between the plates.

12. The automobile according to claim 9, wherein the power assembly mounting portion is provided with a slot, the slot extends along the X-direction of the automobile.

13. The automobile according to claim 12, wherein the number of the slot is multiple, and a reinforcement rib is provided between adjacent slots.

14. The automobile according to claim 10, wherein the first sub-frame mounting portion and/or the second sub-frame mounting portion are provided with avoidance notches on their sidewalls, and the avoidance notches are configured for checking a connection state between the first sub-frame mounting portion and/or the second sub-frame mounting portion and the sub-frame of the automobile.

15. The power assembly structure according to claim 8, wherein further comprising a suspension rear arm and a second sub-frame mounting portion, the second sub-frame mounting portion is configured for being fixedly connected to the sub-frame of the automobile, the suspension front arm and the suspension rear arm are located ahead of and behind the power assembly mounting portion respectively, the suspension rear arm is fixedly connected between the second sub-frame mounting portion and the power assembly mounting portion, the suspension rear arm is arranged to break after the suspension front arm breaks under the squeeze of the power assembly of the automobile.

16. The power assembly structure according to claim 15, wherein the suspension rear arm is provided with a rear arm fracture inducing portion, and the suspension rear arm is arranged to break at the rear arm fracture inducing portion after the suspension front arm breaks under the squeeze of the power assembly of the automobile.

17. The power assembly structure according to claim 15, wherein the suspension front arm and/or the suspension rear arm are provided with an inner cavity, the suspension front arm and/or the suspension rear arm include/includes two plates extending along the X-direction of the automobile and the inner cavity is formed between the plates.

18. The suspension support for improving collision performance according to claim 2, wherein the suspension front arm and the suspension rear arm are located at an outer lateral side of the power assembly mounting portion.

19. The suspension support for improving collision performance according to claim 5, wherein the slot extends along the X-direction.

20. The automobile according to claim 10, wherein the suspension front arm and the suspension rear arm are located at the same lateral side of the power assembly mounting portion.

21. The automobile according to claim 9, wherein the first sub-frame mounting portion is fixed to the sub-frame along the Z-direction of the automobile, the power assembly mounting portion is fixed to the power assembly along the Y-direction of the automobile.

* * * * *